US007897665B2

(12) United States Patent
Kameda et al.

(10) Patent No.: US 7,897,665 B2
(45) Date of Patent: Mar. 1, 2011

(54) TIRE RUBBER COMPOSITION

(75) Inventors: Yoshihiro Kameda, Kanagawa (JP); Naoya Amino, Kanagawa (JP); Yoichi Takizawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 18 days.

(21) Appl. No.: 12/494,431

(22) Filed: Jun. 30, 2009

(65) Prior Publication Data

US 2009/0326109 A1 Dec. 31, 2009

(30) Foreign Application Priority Data

Jun. 30, 2008 (JP) ................................ 2008-169909
Jun. 30, 2008 (JP) ................................ 2008-169953
Jun. 30, 2008 (JP) ................................ 2008-169956

(51) Int. Cl.
*C08K 5/15* (2006.01)
*C08K 5/34* (2006.01)

(52) U.S. Cl. ........................................ 524/110; 524/103

(58) Field of Classification Search ................... 524/110
See application file for complete search history.

(56) References Cited

U.S. PATENT DOCUMENTS 5,859,101 A * 1/1999 Kikkawa et al. .............. 524/110
2008/0058418 A1* 3/2008 D'Angelo et al. ............ 514/560
2008/0223494 A1* 9/2008 Amino et al. .............. 152/209.1

FOREIGN PATENT DOCUMENTS

JP H09-296078 A 11/1997
JP 2007321046 A * 12/2007

OTHER PUBLICATIONS

Translation of JP 2007321046, Dec. 13, 2007.*

* cited by examiner

*Primary Examiner* — Ling-Siu Choi
*Assistant Examiner* — Hui Chin
(74) *Attorney, Agent, or Firm* — Global IP Counselors, LLP

(57) ABSTRACT

Provided is a tire rubber composition blended with an antioxidant that is derived from a raw material other than petroleum resources, the tire rubber composition being capable of achieving an oxidation resistance equal to or higher than a conventional level and of improving forming processability and a low hysteresis loss property. The tire rubber composition includes a blend of: 100 parts by weight of a diene rubber; 5 to 130 parts by weight of an inorganic filler; and 0.01 to 10 parts by weight of a tea extract containing a catechin.

14 Claims, No Drawings

TIRE RUBBER COMPOSITION

BACKGROUND OF THE INVENTION

1. Technical Field

The present invention relates to a tire rubber composition, and more specifically, to a tire rubber composition blended with an antioxidant that is derived from a raw material other than petroleum resources, the tire rubber composition being capable of achieving an oxidation resistance equal to or higher than a conventional level and of improving forming processability and a low hysteresis loss property.

2. Description of the Related Art

Developments of pneumatic tires with higher performances and higher functions have heretofore been conducted by using mainly tire materials derived from petroleum resources. However, in order to solve problems including depletion of the petroleum resources, carbon dioxide emission control, and so forth, there has been a demand for development of pneumatic tires having increased proportions of tire materials that are not derived from the petroleum resources and having improved fuel efficiency so as to reduce carbon dioxide emission.

Nevertheless, there is a problem that it is difficult to ensure conventional tire performances simply by using the tire materials not derived from the petroleum resources. In particular, most of antioxidants used in tire rubber compositions are derived from the petroleum resources and it has been difficult to obtain a sufficient oxidation resistance by using antioxidants derived from raw materials other than the petroleum resources because such antioxidants lack affinity for rubber components.

For example, Japanese patent application Kokai publication No. Hei 9-296078 proposes the use of ascorbic acid (vitamin C) and tocopherol (vitamin E) in a tire rubber composition as antioxidants derived from raw materials other than the petroleum resources. However, when the antioxidants derived from the petroleum resources are completely replaced by these chemical compounds, rubber compositions with these chemical compounds cannot achieve oxidation resistance equivalent or superior to those with the conventional antioxidants. In addition, these chemical compounds may deteriorate forming processability because of the shorter scorch time of the resultant tire rubber composition.

Moreover, a rubber composition with these chemical compounds cannot achieve reduction in a hysteresis loss (or tan δ) for improving fuel efficiency as compared to a case of using an antioxidant derived from the petroleum resources.

SUMMARY OF THE INVENTION

An object of the present invention is to provide a tire rubber composition blended with an antioxidant that is derived from a raw material other than petroleum resources, the tire rubber composition being capable of achieving an oxidation resistance equal to or higher than a conventional level and of improving forming processability and a low hysteresis loss property.

To attain the object, a tire rubber composition according to the present invention includes a blend of: 100 parts by weight of a diene rubber, 5 to 130 parts by weight of an inorganic filler, and 0.01 to 10 parts by weight of a tea extract containing a catechin.

The tea extract preferably contains 5% by weight or more of the catechin. Meanwhile, the inorganic filler is preferably at least one selected from a carbon black and a silica. When a silica is blended, it is preferable to blend 20 parts by weight or more of the silica, relative to 100 parts by weight of the diene rubber.

The rubber composition may be used for a tire tread as follows by using an aromatic vinyl-conjugated diene copolymer having a glass transition temperature of −25° C. or below as the diene rubber. Specifically, the diene rubber preferably contains 10% by weight or more of the aromatic vinyl-conjugated diene copolymer having a glass transition temperature of −25° C. or below, and the inorganic filler preferably includes a carbon black having a nitrogen adsorption specific surface area of 100 to 140 $m^2/g$ and a silica having a CTAB (cetyl trimethyl ammonium bromide) adsorption specific surface area of 80 to 250 $m^2/g$. Here, with respect to 100 parts by weight of the diene rubber, it is preferable to blend: 5 to 50 parts by weight of the carbon black; and 30 to 90 parts by weight of the silica; 0.01 to 5 parts by weight of the tea extract; and 3 to 40 parts by weight of a softener, provided that the total amount of the carbon black and the silica is 40 to 100 parts by weight. Further, it is preferable to blend 2 to 15% by weight of a sulfur-containing silane coupling agent, relative to the blending amount of the silica.

Meanwhile, the rubber composition may be used for a tire tread as follows by using a styrene-butadiene rubber having a glass transition temperature of −25° C. or above as the diene rubber. Specifically, the diene rubber preferably contains 10% by weight or more of the styrene-butadiene rubber having a glass transition temperature of −25° C. or above. Moreover, with respect to 100 parts by weight of this diene rubber, it is preferable to blend: 80 to 150 parts by weight of an inorganic filler containing 10 to 150 parts by weight of a carbon black having a nitrogen adsorption specific surface area of 140 to 350 $m^2/g$; 0.01 to 5 parts by weight of the tea extract; and 60 to 200 parts by weight of a softener. In this case, it is preferable that the glass transition temperature of the styrene-butadiene rubber be −20° C. or above, and that 20% by weight or more of the styrene-butadiene rubber be blended with the diene rubber. Moreover, it is preferable to blend at least one selected from a terpene phenol resin and an aromatic modified terpene resin having a softening point of 80° C. to 130° C., in an amount of 7 to 70 parts by weight with 100 parts by weight of the diene rubber.

The tea extract preferably includes at least one selected from the group consisting of (+)-catechin, (−)-epicatechin, (+)-gallocatechin, (−)-epigallocatechin, (−)-epicatechin gallate, and (−)-epigallocatechin gallate. The tire rubber composition and the tire tread rubber composition of the present invention can be suitably used for constituent materials of a pneumatic tire.

According to the tire rubber composition of the present invention, both of 5 to 130 parts by weight of the inorganic filler and 0.01 to 10 parts by weight of the catechin-containing tea extract are blended with 100 parts by weight of the diene rubber. Therefore, it is possible to achieve an oxidation resistance of the tire rubber composition at an equivalent level to or a higher level than the case of using an antioxidant derived from the petroleum resources because the tea extract functions as an antioxidant. Moreover, this tire rubber composition does not deteriorate forming processability because it is possible to extend the scorch time to an equivalent level to or a higher level than the case of using the conventional antioxidant. Unexpectedly, the present invention makes it possible to reduce a hysteresis loss (or tan δ) of the rubber composition. Therefore, it is possible to reduce rolling resistance of a pneumatic tire and to improve fuel efficiency.

DESCRIPTION OF THE PREFERRED EMBODIMENTS

Now, a tire rubber composition according to a first embodiment of the present invention will be described to begin with.

In a tire rubber composition of the present invention, a diene rubber is used as a rubber component. The diene rubber may be one typically used for the tire rubber composition, such as natural rubber, isoprene rubber, styrene-butadiene rubber, butadiene rubber, acrylonitrile-butadiene rubber, or butyl rubber. Moreover, any of these diene rubbers may be end-modified. Such an end-modifying group may be a carboxyl group, an amino group, a hydroxyl group, an alkoxyl group or a silanol group (—SiOH), for example. Meanwhile, such a diene rubber may contain a modifying group inside the rubber chain. Such a modifying group may be an epoxy group or a ketone group, for example. It is preferable to use natural rubber or epoxidized natural rubber as the diene rubber. Any of these diene rubbers can be used either in a single form or an arbitrarily blended form.

An inorganic filler is blended with the tire rubber composition of the present invention in order to increase rubber strength thereof. The inorganic filler may be carbon black, silica, clay, titanium oxide, talc, calcium carbonate, aluminum hydroxide or mica, for example. Among them, it is preferable to use carbon black and/or silica. A blending amount of the inorganic filler is 5 to 130 parts by weight or preferably 20 to 100 parts by weight relative to 100 parts by weight of the diene rubber. If the blending amount of the inorganic filler is below 5 parts by weight, it is not possible to increase the rubber strength sufficiently. On the other hand, if the blending amount of the inorganic filler exceeds 130 parts by weight, the viscosity of the tire rubber composition is increased and the forming processability thereof is deteriorated.

In this embodiment, the carbon black suitably used therein has a nitrogen adsorption specific surface area ($N_2SA$) preferably of 20 to 200 $m^2/g$, more preferably of 20 to 180 $m^2/g$, and further more preferably of 20 to 130 $m^2/g$. If the nitrogen adsorption specific surface area of the carbon black is below 20 $m^2/g$, it is not possible to increase the rubber strength sufficiently. If the nitrogen adsorption specific surface area exceeds 200 $m^2/g$, the viscosity of the rubber is increased and the forming processability is deteriorated. Moreover, tan $\delta$ thereof is increased and rolling resistance thereof is deteriorated. The nitrogen adsorption specific surface area of the carbon black is determined according to JIS K6217-2.

In this embodiment, the silica suitably used therein has a CTAB adsorption specific surface area preferably of 60 to 250 $m^2/g$, more preferably of 80 to 200 $m^2/g$, and further preferably of 100 to 190 $m^2/g$. If the CTAB adsorption specific surface area of the silica is below 60 $m^2/g$, it is not possible to increase the rubber strength sufficiently. If the CTAB adsorption specific surface area of the silica exceeds 250 $m^2/g$, the viscosity of the rubber is increased and the forming processability is deteriorated. The CTAB adsorption specific surface area of the silica is determined according to ASTM-D3765-80 standard.

It is possible to reduce a hysteresis loss and thereby to reduce the rolling resistance of a pneumatic tire by blending the silica with the tire rubber composition. At the same time, since silica particles tend to agglutinate due to hydrogen bonding of silanol groups that exist on particle surfaces, there is a problem of poor dispersibility in the diene rubber. If there is an aggregate of the silica in the rubber composition, such an aggregate causes a phenomenon (which is called a Payne effect) in which a dynamic elastic modulus in a high strain range becomes lower than a dynamic elastic modulus in a low strain range. Moreover, if the silica has poor dispersibility as described above, it is not possible to obtain the effect to reduce the hysteresis loss sufficiently.

As will be described later, the dispersibility of the silica in the rubber composition of the present invention is improved by blending a catechin-containing tea extract. Accordingly, it is possible to reduce the Payne effect. For this reason, it is possible to further reduce the hysteresis loss. A blending amount of the silica is preferably 20 parts by weight or more and more preferably 30 to 100 parts by weight relative to 100 parts by weight of the diene rubber. If the blending amount of the silica is below 20 parts by weight, aggregates of the silica are less likely to be formed and the effect of the present invention may fail to be actualized. Moreover, it is not possible to obtain the sufficient effect to reduce the hysteresis loss in this case.

The catechin-containing tea extract to be blended with the tire rubber composition of the present invention functions as an antioxidant which can provide the oxidation resistance of the tire rubber composition at an equivalent level to or a higher level than the case of using an antioxidant derived from petroleum resources. Moreover, the catechin-containing tea extract also has functions to maintain or reduce the rubber viscosity of the tire rubber composition and to extend scorch time to an equivalent level to or a higher level than the conventional level. Accordingly, the catechin-containing tea extract suppresses premature vulcanization while not deteriorating the forming processability.

Moreover, the catechin-containing tea extract unexpectedly has an operation to reduce the hysteresis loss (or tan $\delta$) of the rubber composition as compared to the case of using the conventional antioxidant. Accordingly, the catechin-containing tea extract makes it possible to reduce the rolling resistance of the pneumatic tire and thereby to improve fuel efficiency. The reason for such reduction is uncertain. However, it is presumably due to improvement in dispersibility of the inorganic filler as a consequence of blending the inorganic filler and the tea extract together. In particular, when the silica and the tea extract are blended together, there is an operation to improve dispersibility of the silica because it is possible to reduce the Payne effect that is peculiar to the silica-blended rubber composition.

The blending amount of the catechin-containing tea extract is 0.01 to 10 parts by weight relative to 100 parts by weight of the diene rubber. This blending amount is preferably 0.015 to 5 parts by weight, more preferably 0.05 to 3 parts by weight, and further preferably 0.1 to 2.5 parts by weight. If the blending amount of the tea extract is below 0.01 parts by weight, it is not possible to achieve a desired effect. When the blending amount of the tea extract exceeds 10 parts by weight, there is a risk of deteriorating the dispersibility of the inorganic filler by contraries.

The tea extract used in the present invention includes tea polyphenols. The tea polyphenols may include catechin and non-catechin tea polyphenol. The catechin may include epicatechin, epigallocatechin, epicatechin gallate, epigallocatechin gallate, free theaflavin, theaflavin monogallate A, and theaflavin digallate. The catechin content in the tea extract is set to preferably 5% by weight or more preferably 5 to 75% by weight. If the catechin content is below 5% by weight, it is not possible to obtain a sufficient oxidation resistance.

The non-catechin tea polyphenol may include flavonoids except catechin, tannins, for example. The rubber composition containing both catechin and non-catechin tea polyphenol has better dispersibility therein than that of a rubber composition containing only catechin. Accordingly, The catechin from tea extract can function as a more excellent antioxidant by generating a synergistic effect with non-catechin tea polyphenol.

The tea extract used in the present invention is an extract from at least one selected from green tea, oolong tea, and black tea. The tea extract may be extracted from any of the ground products of the above-mentioned tea leaves by using any of water, hot water, and an organic solvent at an extraction temperature of 5° C. to 60° C. Examples of the organic solvent include methanol, ethanol, isopropanol, ethyl acetate, glycerin, and the like. These extractants can be used alone or in combination of multiple kinds.

A fraction extracted with any of the above-mentioned extractants is used as the tea extract. It is possible to use an extraction liquid directly as the tea extract when the extraction liquid is extracted with water, hot water or an organic solvent. However, from a handling perspective, it is desirable to form powder for use by dehydrating the extraction liquid by means of spray drying, freeze-drying, and so forth.

In the tea extract used in the tire rubber composition of the present invention, the above-described tea extract can be used directly or as an antioxidant which is a mixture in which another natural compound and/or a surfactant are added to the tea extract. The natural compound includes tocopherol, ascorbic acid, polyphenols except tea polyphenols, vegetable oil, animal oil, for example. The surfactant includes monoglyceryl fatty acid ester, polyglyceryl fatty acid ester, sucrose fatty acid ester, sorbitan fatty acid ester, polyoxyethylene sorbitan fatty acid ester, propylene glycol fatty acid ester, polyglyceryl condensed acid ester, for example.

Such antioxidants include commercially available products such as Sunphenon DK (tea extract including 92% by weight of tea polyphenols containing 74% by weight of catechin, 8% by weight of others such as mineral, ash, for example), Sunflavon HG (tea extract including 89% by weight of tea polyphenols containing 73% by weight of catechin, 11% by weight of others such as mineral, ash, for example), Sunkatol No. 1 (antioxidant including 10% by weight of tea polyphenols containing 70% by weight of catechin, the tea polyphenols being treated with surfactant), which are manufactured by Taiyo Kagaku Co., Ltd.

Next, a second embodiment of the present invention will be described. The second embodiment is dependent on the above-described first embodiment. In the second embodiment, a tire tread rubber composition includes an aromatic vinyl-conjugated diene copolymer having a glass transition temperature of −25° C. or below as the diene rubber. In addition to the above-described effect of the first embodiment, this second embodiment can provide a rubber composition blended with the carbon black and the silica, the rubber composition being capable of improving wear resistance while not deteriorating the rolling resistance and extrusion formability.

A high performance type pneumatic tire for a passenger car needs to have a grip performance improved to a high level. To meet this requirement, soft rubber having a low glass transition temperature is blended with a tread rubber composition. However, such a soft rubber composition has a disadvantage of low wear resistance. In order to improve the wear resistance of a rubber composition, it is a common practice to blend the carbon black and the silica together. Specifically, it is possible to improve the wear resistance of the soft rubber by using a carbon black having small grain sizes or by increasing the blended amount of the carbon black. However, this rubber composition has a problem of deterioration in the extrusion formability or the rolling resistance, which is attributable to an increase in the rubber viscosity and to deterioration in a mixing performance of the carbon black. Similarly, an increase in the blending amount of the silica may also cause a problem of the increase in the rubber viscosity and deterioration in the dispersibility. In particular, it is not possible to obtain an effect of improving the wear resistance if the silica has the poor dispersibility.

A technique to blend a silane coupling agent together with the silica (see Japanese patent application Kokai publication No. Hei 7-48476, for example) has been known as a countermeasure for improving the dispersibility of the silica. However, an increase in the amount of the silane coupling agent in an attempt to further improve the dispersibility of the silica may lead to premature vulcanization. In this context, there has been a limitation for improving the silica dispersion. Moreover, even when the silane coupling agent is blended, it is not possible to improve the extrusion formability when large amounts of the carbon black and the silica are blended at the same time because it is not possible to achieve the operation to reduce the viscosity of the rubber composition in that case. Further, the rubber composition blended with the carbon black and the silica at the same time has a problem that an extruded body tends to shrink at the time of extrusion molding and therefore has poor form stability. This problem is not solved merely by blending the silane coupling agent. Therefore, it has been difficult to improve the wear resistance of the soft rubber composition without deteriorating the rolling resistance and the extrusion formability.

The tire tread rubber composition according to the second embodiment of the present invention is characterized by blending: 5 to 50 parts by weight of carbon black having a nitrogen adsorption specific surface area of 100 to 140 $m^2/g$; 30 to 90 parts by weight of silica having a CTAB adsorption specific surface area of 80 to250 $m^2/g$; 0.01 to5parts by weight of the tea extract; and 3 to 40 parts by weight of a softener, with 100 parts by weight of a diene rubber containing 10% by weight or more of an aromatic vinyl-conjugated diene copolymer having a glass transition temperature of −25° C. or below, provided that the total amount of the carbon black and the silica is 40 to 100 parts by weight. The tire tread rubber composition is also characterized by blending 2 to 15% by weight of a sulfur-containing silane coupling agent relative to a blending amount of the silica.

According to the tire tread rubber composition, the above-described blending proportion restricts the blending amount of the carbon black and thereby improves the dispersibility of the silica. Hence, it is possible to improve the wear resistance of the soft rubber composition having the low glass transition temperature without deteriorating the rolling resistance thereof. Moreover, by blending 0.01 to 5 parts by weight of the tea extract at the same time, it is possible to further improve the dispersibility of the silica and to suppress an extruded body from shrinking at the time of extruding the rubber composition. In this way, it is possible to achieve the extrusion formability equal to or higher than a conventional level and to further improve the low rolling resistance and the wear resistance of the rubber composition.

In the tire rubber composition of this embodiment, a diene rubber is used as the rubber component. The diene rubber used herein needs to always contain the aromatic vinyl-conjugated diene copolymer having a glass transition temperature of −25° C. or below. The grip performance required for treads of a high-performance tire is ensured by blending this aromatic vinyl-conjugated diene copolymer. The aromatic vinyl-conjugated diene copolymer may be styrene-butadiene rubber (SBR), for example. Any type of solution-polymerized styrene-butadiene rubber and emulsion-polymerized styrene-butadiene rubber can be used as the styrene-butadiene rubber as long as the styrene-butadiene rubber has the above-mentioned glass transition temperature. Meanwhile, the styrene-butadiene rubber used herein may also be an oil-extended product. However, the glass transition temperature in a case of the oil-extended SBR is determined based on the glass transition temperature of the styrene-butadiene rubber in a state without containing any oil components.

The glass transition temperature of the aromatic vinyl-conjugated diene copolymer is set to −25° C. or below. Here, the glass transition temperature is preferably −25° C. to −70° C. and more preferably −25° C. to −65° C. If the glass transition temperature of the aromatic vinyl-conjugated diene copolymer is too low, it is possible to achieve the excellent wear resistance but a wet grip performance is degraded by an excessive drop in tan δ in a low-temperature range or around −10° C. in particular. As a consequence, it is not possible to obtain a tire tread having the wear resistance performance and the grip performance at the same time. In the present invention, the glass transition temperature is defined as a temperature at an intersecting point of the extended line of a base line on a low-temperature side and the extended line of an inclination in a transition range (an inclined straight line), of a thermogram measured at a temperature raising rate of 20° C./min by differential scanning calorimetry (DSC).

The blending amount of the aromatic vinyl-conjugated diene copolymer having a glass transition temperature of −25° C. or below in the diene rubber is 10% by weight or more, preferably 15 to 100% by weight, and more preferably 25 to 100% by weight. If the blending amount of the aromatic vinyl-conjugated diene copolymer having a glass transition temperature of −25° C. or below is below 10% by weight, it is difficult to ensure the grip performance.

In the second embodiment, the diene rubber other than the aromatic vinyl-conjugated diene copolymer having a glass transition temperature of −25° C. or below may be natural rubber, isoprene rubber, butadiene rubber, acrylonitrile-butadiene rubber, butyl rubber, styrene-butadiene rubber having a glass transition temperature higher than −25° C., and the like. Among them, butadiene rubber, natural rubber, and isoprene rubber are preferable. These diene rubbers may be used alone or in any blend thereof.

In the second embodiment, the carbon black improves the wear resistance of the above-described soft rubber composition. The blending amount of the carbon black is 5 to 50 parts by weight, or preferably 10 to 30 parts by weight relative to 100 parts by weight of the diene rubber. If the blending amount of the carbon black is below 5 parts by weight, the wear resistance is insufficient and it is not possible to achieve the sufficiently high rubber strength. On the other hand, if the blending amount of the carbon black exceeds 50 parts by weight, the mixing performance in the rubber is deteriorated whereby the rolling resistance and the extrusion formability are deteriorated.

The carbon black suitably used in this case has a nitrogen adsorption specific surface area ($N_2SA$) of 100 to 140 $m^2/g$ and preferably of 100 to 130 $m^2/g$. If the nitrogen adsorption specific surface area of the carbon black is below 100 $m^2/g$, it is not possible to achieve the sufficiently high wear resistance and the sufficiently high rubber strength. If the nitrogen adsorption specific surface area of the carbon black exceeds 140 $m^2/g$, the rolling resistance is deteriorated and the rubber viscosity is increased, thereby deteriorating the extrusion formability. The nitrogen adsorption specific surface area ($N_2SA$) of the carbon black is determined according to JIS K6217-2.

In the second embodiment, the silica improves the wear resistance of the rubber composition and reduces the hysteresis loss (or tan δ) of the rubber composition, thereby reducing the rolling resistance. The blending amount of the silica is 30 to 90 parts by weight and preferably 40 to 80 parts by weight relative to 100 parts by weight of the diene rubber. If the blending amount of the silica is below 30 parts by weight, it is not possible to sufficiently obtain the effect of reducing the hysteresis loss (or tan δ). On the other hand, the blending amount of the silica in excess of 90 parts by weight causes deterioration in processability, such as a longer blending time period, and is therefore undesirable.

The silica used in this embodiment has a CTAB adsorption specific surface area of preferably 80 to 250 $m^2/g$ and more preferably 100 to 200 $m^2/g$. If the CTAB adsorption specific surface area of the silica is below 80 $m^2/g$, breaking strength is reduced and the wear resistance is deteriorated. If the CTAB adsorption specific surface area of the silica exceeds 250 $m^2/g$, the viscosity of the rubber is increased and thus the forming processability is deteriorated. The CTAB adsorption specific surface area of the silica is determined according to ASTM-D3765-80 standard.

The total amount of the carbon black and the silica is 40 to 100 parts by weight and preferably 50 to 90 parts by weight relative to 100 parts by weight of the diene rubber. If the total amount of the carbon black and the silica is below 40 parts by weight, it is not possible to achieve the sufficient wear resistance. On the other hand, if the total amount of the carbon black and the silica exceeds 100 parts by weight, the viscosity of the tire tread rubber composition is increased and thus the extrusion formability is deteriorated.

In the second embodiment, the dispersibility of the silica in the diene rubber is improved by blending the sulfur-containing silane coupling agent. The improvement in dispersibility of the silica leads to improvement in the low rolling resistance and the wear resistance of the rubber composition. The blending amount of the sulfur-containing silane coupling agent may be 2 to 15% by weight and preferably 6 to 10% by weight relative to the blending amount of the silica. If the sulfur-containing silane coupling agent is below 2% by weight relative to the blending amount of the silica, it is not possible to achieve the low rolling resistance and the wear resistance at the same time due to deterioration in dispersion of the silica. If the sulfur-containing silane coupling agent exceeds 15% by weight, the scorch time of the rubber composition becomes too short and the rubber composition is apt to cause premature vulcanization.

The sulfur-containing silane coupling agent may be any substance as long as it is applicable to silica-blended rubber compositions. For example, the sulfur-containing silane coupling agent may be bis(3-triethoxysilylpropyl)tetrasulfide, bis(3-triethoxysilylpropyl)disulfide, 3-trimethoxysilylpropylbenzothiazol tetrasulfide, γ-mercaptopropyltriethoxysilane, 3-octanoylthiopropyltriethoxysilane, and the like.

In the second embodiment, the tea extract further improves the dispersibility of the silica. By improving the dispersibility of the silica, it is possible to further improve the low rolling resistance and the wear resistance. Moreover, the tea extract has an operation to reduce the hysteresis loss (tan δ at 60° C.) of the rubber composition so that it is possible to further improve the low rolling resistance. For this reason, it is possible to suppress the blending amount of the sulfur-containing silane coupling agent. Accordingly, it is possible to prevent the premature vulcanization of the rubber composition attributable to the silane coupling agent and thereby to achieve excellent forming processability. Furthermore, even when both of the carbon black and the silica are blended, it is possible to suppress shrinkage of an extruded body at the time of extruding the tire tread rubber composition. Therefore, it is possible to achieve the extrusion formability at a level equal to or higher than that of the rubber composition formed by blending only the carbon black, the silica, and the sulfur-containing silane coupling agent. Although the reason is unclear, it is conceivable that the tea extract contains a large number of hydroxyl groups and therefore has strong affinity for the silica particles.

The blending amount of the tea extract is 0.01 to 5 parts by weight and preferably 0.03 to 3 parts by weight relative to 100 parts by weight of the diene rubber. If the blending amount of the tea extracts is below 0.01 parts by weight, it is not possible to obtain the desired effect. On the other hand, if the blending amount of the tea extract exceeds 5 parts by weight, the wear resistance is deteriorated because the dispersibility of the inorganic filler is deteriorated.

The previously mentioned tea extracts can be used in the second embodiment. The compounds to be contained in the tea extract may be (+)-catechin, (−)-epicatechin, (+)-gallocatechin, (−)-epigallocatechin, (−)-epicatechin gallate, and (−)-epigallocatechin gallate, for example. The tea extract only needs to contain at least one selected from the group consisting of the above-mentioned compounds. It is preferable that the tea extract contain catechin among others, and the content of catechin in the tea extract may be preferably 5% by weight or above and more preferably 5 to 90% by weight.

In the second embodiment, the softener improves the grip performance based on the diene rubber containing the above-described aromatic vinyl-conjugated diene copolymer having a glass transition temperature of −25° C. or below to a higher level. The blending amount of the softener is 3 to 40 parts by weight and preferably 3 to 38 parts by weight relative to 100 parts of the diene rubber. If the blending amount of the softer is below 3 parts by weight, it is not possible to ensure the grip performance. On the other hand, if the blending amount of the softener exceeds 40 parts by weight, the wear resistance and the low rolling resistance are deteriorated. Note that the softener refers to all softeners that are included in the tire tread rubber composition. When the diene rubber is oil-extended, the blending amount of the softener refers to a total amount of components used for such oil extension (process oil or extender oil) and the softener blended with the rubber composition.

Examples of the softener include petroleum-based softeners and vegetable oil-based softeners. The petroleum-based softeners may be paraffinic oil, aromatic oil, and naphthenic oil, for example. Among them, the aromatic oil is preferable.

Next, a third embodiment of the present invention will be described. The third embodiment is dependent on the above-described first embodiment. In the third embodiment, a tire tread rubber composition includes an aromatic vinyl-conjugated diene copolymer having a glass transition temperature of −25° C. or above as the diene rubber. In addition to the above-described effect of the first embodiment, the third embodiment of the present invention makes it possible to quickly establish a dry grip performance, to extend persistence of the dry grip performance, and to improve blowout resistance.

It is known that a grip performance of a pneumatic tire is largely influenced by a tire temperature so that it is not possible to obtain a sufficient grip performance under a low-temperature condition. Particularly, in the case of a racing tire, a rubber composition constituting the tread needs to have a property to establish a high-temperature condition as quickly as possible after starting driving. For this purpose, a large amount of filler such as the carbon black is blended with the tread rubber composition. However, the rubber composition blended with the large amount of the filler has a problem of occurrence of a destabilization phenomenon due to the heat after a long period of high-speed driving, which leads to gradual degradation of the dry grip performance and a blowout as a consequence.

As a countermeasure for this problem, Japanese patent application Kokai publication No. 2007-246625 proposes tire tread rubber compositions each prepared by blending carbon black having small grain sizes with styrene-butadiene rubber having a high glass transition temperature, the tire tread rubber composition being configured to enhance quick establishment of a dry grip performance and to improve the resistance to the destabilization due to the heat. However, this tire tread rubber composition still has a room for further improvement in terms of heat resistance (blowout resistance) when high-speed driving is continued.

The tire tread rubber composition according to the third embodiment of the present invention is characterized by blending: 80 to 150 parts by weight of the inorganic filler which contains 10 to 150 parts by weight of the carbon black having a nitrogen adsorption specific surface area of 140 to 350 $m^2/g$; 0.01 to 5 parts by weight of the tea extract; and 60 to 200 parts by weight of the softener, relative to 100 parts by weight of the diene rubber containing 10% by weight or more of the styrene-butadiene rubber having a glass transition temperature of −25° C. or above.

According to this tire tread rubber composition, the above-described blending composition makes it possible to establish the dry grip performance quickly after starting driving and to extend persistence thereof. Moreover, by blending 0.01 to 5 parts by weight of the tea extract at the same time, the tea extract functions as an antioxidant to improve the heat resistance of the rubber composition, and provides an operation to suppress an increase in hysteresis loss (tan δ at 60° C.) when the rubber composition has a high temperature, to suppress further heat generation of the tire under the high-temperature condition. Accordingly, it is possible to improve the resistance to the destabilization due to the heat and the blowout resistance.

In the tire rubber composition of the third embodiment, a diene rubber is used as the rubber component. The diene rubber used herein needs always to contain the styrene-butadiene rubber having a glass transition temperature of −25° C. or above. The resistance to the destabilization due to the heat at the time of high-speed driving is improved by containing the styrene-butadiene rubber having a glass transition temperature of −25° C. or above. The glass transition temperature of the styrene-butadiene rubber is preferably −20° C. or above and more preferably −20° C. to −5° C. Here, if the glass transition temperature of the styrene-butadiene rubber is too high, it takes long time for the tire to be able to generate a large amount of heat so that it is not possible to establish the dry grip performance quickly.

As for the type of the styrene-butadiene rubber, it is possible to use any of solution-polymerized styrene-butadiene rubber and emulsion-polymerized styrene-butadiene rubber as long as the material has the above-mentioned glass transition temperature. The styrene-butadiene rubber used herein may also be an oil-extended product. However, the glass transition temperature in a case of the oil-extended SBR is determined based on the glass transition temperature of the styrene-butadiene rubber in the state without containing any oil components. Moreover, the glass transition temperature is defined as the temperature at the intersecting point of the extended line of a base line on a low-temperature side and the extended line of an inclination in a transition range (an inclined straight line), of a thermogram measured at a temperature raising rate of 20° C./min by the differential scanning calorimetry (DSC).

The Blending amount of the styrene-butadiene rubber having a glass transition temperature of −25 C. or above in the diene rubber is 10% by weight or more, preferably 20% by weight or more, and more preferably 25 to 100% by weight. If the blending amount of the styrene-butadiene rubber having a glass transition temperature of −25° C. or above is below 10% by weight, the heat generation of the rubber becomes too low and an initial grip performance is reduced. Moreover, this tire will exhibit a low grip performance at any time.

In the third embodiment, the diene rubber other than the styrene-butadiene rubber having a glass transition temperature of −25° C. or above may be natural rubber, isoprene rubber, butadiene rubber, acrylonitrile-butadiene rubber, butyl rubber, styrene-butadiene rubber having a glass transition temperature below −25° C., and the like. Among them, natural rubber, isoprene rubber, butadiene rubber, and styrene-butadiene rubber having a glass transition temperature below −25° C. are preferable. These diene rubbers may be used alone or in any blend thereof.

The rubber strength of the tire tread rubber composition of the third embodiment is increased by blending the carbon black. The blending amount of the carbon black is 10 to 150 parts by weight, and preferably 60 to 140 parts by weight relative to 100 parts by weight of the diene rubber. If the blending amount of the carbon black is below 10 parts by weight, it is not possible to increase the rubber strength sufficiently. On the other hand, if the blending amount of the carbon black exceeds 150 parts by weight, the resistance to the destabilization due to the heat is deteriorated. Moreover, the viscosity of the tire tread rubber composition is increased and the forming processability is deteriorated in this case.

The carbon black suitably used in the third embodiment has a nitrogen adsorption specific surface area ($N_2SA$) of 140 to 350 $m^2/g$ and preferably of 190 to 300 $m^2/g$. If the nitrogen adsorption specific surface area of the carbon black is below 140 $m^2/g$, it is not possible to increase the rubber strength sufficiently. If the nitrogen adsorption specific surface area exceeds 350 $m^2/g$, the resistance to the destabilization due to the heat and the blowout resistance are deteriorated. Moreover, the wet grip performance is deteriorated and the rubber viscosity is increased, whereby the processability is deteriorated in this case. The nitrogen adsorption specific surface area ($N_2SA$) of the carbon black is determined according to JIS K6217-2.

It is also possible to blend an inorganic filler other than the carbon black with the tire tread rubber composition of the third embodiment. The blending amount of the inorganic filler inclusive of 10 to 150 parts by weight of the carbon black is 80 to 150 parts by weight and preferably 10 to 70 parts by weight relative to 100 parts by weight of the diene rubber. Accordingly, when only the carbon black with the diene rubber is blended, the blending amount of the carbon black is set to 80 to 150 parts by weight. If the blending amount of the inorganic filler inclusive of the carbon black is below 80 parts by weight, it is not possible to increase the rubber strength sufficiently. On the other hand, if the blending amount of the inorganic filler inclusive of the carbon black exceeds 150 parts by weight, the resistance to the destabilization due to the heat is deteriorated. Moreover, the viscosity of the tire tread rubber composition is increased and the forming processability is deteriorated in this case.

The inorganic filler other than the carbon black may be silica, clay, titanium oxide, talc, calcium carbonate, aluminum hydroxide, mica, and the like, for example. Among them, silica is preferable because silica can improve the wet grip performance of the tire tread rubber composition.

Here, since silica particles tend to agglutinate due to hydrogen bonding of silanol groups that exist on particle surfaces, there is a problem of poor dispersibility in the diene rubber. If the silica has the poor dispersibility, it is not possible to obtain the operation to improve the wet grip performance. The tire tread rubber composition of the present invention can improve the dispersibility of the silica by blending the tea extract. Hence it is possible to further reduce the hysteresis loss.

In the tire tread rubber composition of the third embodiment, the blending amount of the silica is preferably 20 to 140 parts by weight and more preferably 30 to 130 parts by weight relative to 100 parts by weight of the diene rubber. If the blending amount of the silica is below 20 parts by weight, it is not possible to obtain the sufficient effect of improving the wet grip performance. On the other hand, if the blending amount of the silica exceeds 140 parts by weight, it is difficult to blend the silica with the rubber and to obtain the tread rubber composition in a uniform state having a high degree of the silica dispersibility. Moreover, the scorch time is shortened and the extrusion property of the tread rubber composition is also deteriorated, thereby degrading productivity in this case.

The silica suitably used in the third embodiment may have a CTAB adsorption specific surface area of preferably 100 to 250 $m^2/g$ and more preferably 110 to 200 $m^2/g$. If the CTAB adsorption specific surface area of the silica is below 100 $m^2/g$, it is not possible to increase the rubber strength sufficiently. If the CTAB adsorption specific surface area of the silica exceeds 250 $m^2/g$, the viscosity of the rubber is increased and the processability is deteriorated. The CTAB adsorption specific surface area of the silica is determined according to ASTM-D3765-80 standard.

The tea extract to be blended with the tire tread rubber composition of the third embodiment functions as an antioxidant and increases the heat resistance. Accordingly, it is possible to improve the resistance to the destabilization due to the heat and the blowout resistance of the tire tread rubber composition. Unexpectedly, the tea extract also has operations to reduce the hysteresis loss (tan δ at 60° C.) of the rubber composition at the time of a high temperature and to suppress further heat generation of the tire that reaches the high temperature. In this way, it is possible to further improve the resistance to the destabilization due to the heat and the blowout resistance. Although the reason is unclear, it is conceivable that the dispersibility of the carbon black and of the inorganic filler is improved by blending the carbon black or the mixture of the carbon black and the inorganic filler with the tea extract at the same time.

The blending amount of the tea extract is 0.01 to 5 parts by weight and preferably in a range from 0.03 to 4 parts by weight relative to 100 parts by weight of the diene rubber. If the blending amount of the tea extracts is below 0.01 parts by weight, it is not possible to obtain the desired effect. On the other hand, if the blending amount of the tea extract exceeds 5 parts by weight, the resistance to the destabilization due to the heat and the blowout resistance are deteriorated because the dispersibility of the inorganic filler is deteriorated. In addition, the wet grip performance is also deteriorated in this case. The tea extract to be used in the third embodiment may be the same substances as those described in the second embodiment.

The dry grip performance and the wet grip performance of the tire tread rubber composition of the third embodiment are improved by blending the softener. The blending amount of the softener is 60 to 200 parts by weight and preferably 70 to 180 parts by weight relative to 100 parts of the diene rubber. If the blending amount of the softer is below 60 parts by weight, it is not possible to obtain the operations to improve the dry grip performance and the wet grip performance. On the other hand, the resistance to the destabilization due to the heat and the blowout resistance are deteriorated if the blending amount of the softener exceeds 200 parts by weight. Note that the softer refers to all softeners that are included in the tire tread rubber composition. When the diene rubber is oil-extended, the blending amount of the softener refers to the total amount of components used for such oil extension (process oil or extender oil) and the softener blended with the rubber composition.

Examples of the softener includes petroleum-based softeners and vegetable oil-based softeners. The petroleum-based softeners may be paraffinic oil, aromatic oil, and naphthenic oil, for example. Among them, the aromatic oil is preferable.

It is possible to blend terpene phenol resin and/or aromatic modified terpene resin with the tire tread rubber composition of the third embodiment. By blending the terpene phenol resin and/or the aromatic modified terpene resin, it is possible to establish the dry grip performance of the tire tread rubber composition quickly after starting driving, and to improve the resistance to the destabilization due to the heat by extending the persistence of the dry grip performance.

The blending amount of the terpene phenol resin and/or the aromatic modified terpene resin is preferably 5 to 70 parts by weight and more preferably 10 to 65 parts by weight relative to 100 parts by weight of the diene rubber. If the blending amount is below 5 parts by weight, it is not possible to improve the quick establishment of the dry grip performance. On the other hand, if the blending amount exceeds 70 parts by weight, the persistence of the dry grip performance and the resistance to the destabilization due to the heat are deteriorated in spite of excellent performance in the quick establishment of the dry grip performance.

The terpene phenol resin and the aromatic modified terpene resin used in the third embodiment preferably has a softening point of 80° C. to 130° C., and the softening point is more preferably 85° C. to 125° C. If the softening point is below 80° C., it is not possible to obtain the sufficient dry grip performance. On the other hand, if the softening point exceeds 130° C., it is not possible to accelerate the establishment of the dry grip performance at an initial stage of driving. Here, the softening point refers to a softening point according to JIS K6220-1 which and measured by a DSC (a differential scanning calorimeter).

The terpene phenol resin and the aromatic modified terpene resin used therein can be appropriately selected from those used in normal tire rubber compositions. The terpene phenol resin may be YS Polyster T100 (softening point: 100° C.), YS Polyster T115 (softening point: 115° C.), and YS Polyster U115 (softening point: 115° C.), which are manufactured by Yasuhara Chemical Co., Ltd., for example. Meanwhile, the aromatic modified terpene resin may be YS Resin TO85 (softening point: 85° C.), YS Resin TO105 (softening point: 105° C.), YS Resin TO115 (softening point: 115° C.), and YS Resin TO125 (softening point: 125° C.), which are manufactured by Yasuhara Chemical Co., Ltd., for example.

It is possible to blend various additives generally used in tire rubber compositions, including, vulcanizing agents, vulcanization accelerators, antioxidants, plasticizers, coupling agents, and the like with the tire rubber composition of the present invention. Such an additive can be kneaded with the rubber composition by a general method, thereby being used for a curing or crosslinking process. Blending amounts of these additives may be set to conventional and general blending amounts so far as the usages thereof do not contradict with the object of the present invention. The tire rubber composition of the present invention can be manufactured by mixing the above-mentioned components by using publicly-known rubber kneading machines including Banbury mixers, kneaders, and rolls, for example.

The tire rubber composition of the present invention possesses the oxidation resistance and the forming processability which are equivalent to or superior to the case of using antioxidants derived from petroleum resources. Moreover, the tire rubber composition achieves a characteristic to reduce the hysteresis loss (or tan δ) of the rubber composition. Accordingly, it is possible to reduce the rolling resistance of a pneumatic tire and to improve fuel efficiency. The pneumatic tire using this tire rubber composition is a product having excellent forming processability and stable quality. Moreover, the pneumatic tire has excellent durability and improved fuel efficiency.

In addition to the effect of the first embodiment, the tire tread rubber component of the second embodiment can improve the wear resistance without deteriorating the rolling resistance or the extrusion formability. This tire tread rubber composition can be suitably used not only for a racing tire but also for a tire for a passenger car having an excellent grip performance. These pneumatic tires are formed of extruded bodies with improved form stability formed of the rubber composition having excellent extrusion formability. Therefore, the pneumatic tires can achieve excellent quality stability and a higher level of the wear resistance as well as a higher level of the low rolling resistance at the same time.

In addition to the effect of the first embodiment, the tire tread rubber component of the third embodiment allows quick establishment of the dry grip performance after starting driving and extension of persistence of the quickly established dry grip performance. Moreover, the rubber composition has high heat resistance and suppresses the hysteresis loss at a high temperature. Accordingly, it is possible to further enhance the resistance to the destabilization due to the heat and to improve the blowout resistance. This tire tread rubber composition can be suitably used not only for a racing tire but also for a passenger car tire. These pneumatic tires have the excellent dry grip performance and the excellent blowout resistance. Therefore, it is possible to achieve safe driving at a high speed.

Now, the present invention will be described further in detail based on examples. It is to be understood, however, that the present invention are not limited only to these examples.

EXAMPLES

Examples 1 to 15

Eighteen types of tire rubber compositions having blending proportions as shown in Tables 1 to 3 (Examples 1 to 15 and Comparative Examples 1 to 3) were prepared. Specifically, the respective blending components except sulfur and a vulcanization accelerator were weighted and kneaded for 5 minutes with a Banbury mixer having a capacity of 1.8 L. Then, masterbatches were discharged at 160° C. and were cooled down to a room temperature. These masterbatches were fed to the Banbury mixer having a capacity of 1.8 L and then the sulfur and the vulcanization accelerator were added and mixed together.

The eighteen types of the tire rubber compositions (Examples 1 to 15 and Comparative Examples 1 to 3) thus obtained were subjected to measurement of Mooney viscosity and scorch time in accordance with methods shown below. Moreover, each of the tire rubber compositions was cured for 30 minutes at 150° C. in a mold having a predetermined shape, so that a test piece was prepared. Thereafter, tan δ and oxidation resistance tests were conducted on the basis of breaking strength and breaking elongation in accordance with methods shown below. Meanwhile, ten types of the rubber compositions blended with a silica (Examples 8 to 15 and Comparative Examples 2 and 3) were subjected to measurement of Payne effects in accordance with a method shown below.

Mooney Viscosity

The Mooney viscosity ($ML_{1+4}$) of each of the tire rubber compositions is measured with a Mooney viscometer in accordance with JIS K6300 by using an L-type rotor and under conditions of a preheating period of 1 minute, a rotating period of the rotor of 4 minutes, a temperature of 100° C., and revolutions of 2 rpm. The obtained results were shown in the form of indices relative to a value in Comparative Example 1 defined as 100 in Table 1 and in the form of indices relative to a value in Comparative Example 2 defined as 100 in Tables 2 and 3. A smaller index represents better forming processability.

Scorch Time

The Mooney viscosity ($ML_{1+4}$) of each of the tire rubber compositions was measured with the Mooney viscometer in accordance with JIS K6300 by using the L-type rotor and under conditions of a preheating period of 1 minute, a rotating period of the rotor of 4 minutes, a temperature of 125° C., and revolutions of 2 rpm. Thus, change in viscosity with time was determined. Specifically, the time taken for the Mooney viscosity to rise by five Mooney units from the initial value was measured. The obtained results are shown in the form of indices relative to a value in Comparative Example 1 defined as 100 in Table 1 and in the form of indices relative to a value in Comparative Example 2 defined as 100 in Tables 2 and 3. A longer index represents an aspect that the scorch time is longer and premature vulcanization is less likely to occur, i.e. that an applicable tire rubber composition has better forming processability.

tan δ

Values tan δ at a temperature of 60° C. were measured by using a viscoelasticity spectrometer manufactured by Toyo Seiki Seisakusho, Ltd. under conditions of a static strain of 10%, a dynamic strain of ±2%, and a frequency of 20 Hz. The obtained results are shown in the form of indices relative to a value in Comparative Example 1 defined as 100 in Table 1 and in the form of indices relative to a value in Comparative Example 2 defined as 100 in Tables 2 and 3. A smaller index of tan δ represents a smaller hysteresis loss and lower rolling resistance.

Oxidation Resistances (Change Rates of Breaking Strength and Breaking Elongation)

Type-3 dumbbell test pieces in accordance with JIS K6251 were formed by use of each of the obtained test pieces. The dumbbell test pieces were split into two groups and one of the groups of test pieces were heated at 80° C. for 96 hours (an aging treatment). Tension tests were conducted, under conditions of a temperature of 20° C. and a tension rate of 500 mm/min, by use of the dumbbell test pieces not subjected to the aging treatment and the dumbbell test pieces after the aging treatment to thereby measure breaking strength and breaking elongation. Change ratios (%) defined by (physical properties after the aging treatment/physical properties before the aging treatment×100) were calculated for the test pieces and are defined as oxidation resistances in terms of the breaking strength and the breaking elongation. The obtained results are shown in the form of indices relative to a value in Comparative Example 1 defined as 100 in Table 1 and in the form of indices relative to a value in Comparative Example 2 defined as 100 in Tables 2 and 3. A larger index represents a higher oxidation resistance in terms of the breaking strength or the breaking elongation.

Payne Effect

Strain shear stresses G' of the obtained test pieces were measured in a strain range from 0.28% to 30.0% by using a RPA 2000 manufactured by Alpha Technologies. A difference G' (0.28)−G' (30) between the strain shear stress G' (0.28) at a strain of 0.28% and the strain shear stress G' (30) at the strain of 30.0% was calculated as the Payne effect. The obtained results were shown in the form of indices relative to a value in Comparative Example 2 defined as 100 in Tables 2 and 3. A smaller index represents a smaller Payne effect and better dispersibility of the silica.

TABLE 1

| | | Comparative Example 1 | Example 1 | Example 2 | Example 3 | Example 4 | Example 5 | Example 6 | Example 7 |
|---|---|---|---|---|---|---|---|---|---|
| NR | p.b.w. | 100 | 100 | 100 | 100 | 100 | 100 | 100 | 100 |
| Carbon black 1 | p.b.w. | 50 | 50 | 50 | 50 | 50 | 50 | 90 | 130 |
| Tea extract 1 | p.b.w. | | 2 | | | | | | |
| Tea extract 2 | p.b.w. | | | 2 | | | | | |
| Tea extract 3 | p.b.w. | | | | 0.5 | 2 | 5 | 5 | 5 |
| Antioxidant 1 | p.b.w. | 1 | | | | | | | |
| Antioxidant 2 | p.b.w. | 1 | | | | | | | |
| Zinc white | p.b.w. | 2.5 | 2.5 | 2.5 | 2.5 | 2.5 | 2.5 | 2.5 | 2.5 |
| Stearic acid | p.b.w. | 2 | 2 | 2 | 2 | 2 | 2 | 2 | 2 |
| Wax | p.b.w. | 2 | 2 | 2 | 2 | 2 | 2 | 2 | 2 |
| Aromatic oil 1 | p.b.w. | 5 | 5 | 5 | 5 | 5 | 5 | 5 | 5 |
| Vulcanization accelerator 1 | p.b.w. | 2 | 2 | 2 | 2 | 2 | 2 | 2 | 2 |
| Sulfur 1 | p.b.w. | 1.8 | 1.8 | 1.8 | 1.8 | 1.8 | 1.8 | 1.8 | 1.8 |
| (Catechin content) | p.b.w. | — | 1.36 | 1.30 | 0.035 | 0.14 | 0.35 | 0.35 | 0.35 |
| Mooney viscosity | Index | 100 | 100 | 100 | 98 | 98 | 95 | 114 | 136 |
| Scorch time | Index | 100 | 102 | 113 | 102 | 100 | 98 | 87 | 75 |
| tan δ (60° C.) | Index | 100 | 94 | 89 | 99 | 96 | 88 | 121 | 156 |
| Oxidation resistance of breaking strength | Index | 100 | 105 | 104 | 101 | 103 | 107 | 117 | 104 |
| Oxidation resistance of breaking elongation | Index | 100 | 104 | 105 | 100 | 102 | 106 | 106 | 102 |

In above Table 1, "p.b.w." means "parts by weight".

TABLE 2

| | | Comparative Example 2 | Example 8 | Example 9 | Example 10 | Example 11 | Example 12 | Example 13 | Example 14 |
|---|---|---|---|---|---|---|---|---|---|
| NR | p.b.w. | 100 | 100 | 100 | 100 | 100 | 100 | 100 | 100 |
| Carbon black 1 | p.b.w. | 5 | 5 | 5 | 25 | 30 | 5 | 5 | 5 |
| Silica 1 | p.b.w. | 50 | 50 | 50 | 30 | 15 | 50 | 50 | 50 |
| Coupling agent | p.b.w. | 4 | 4 | 4 | 2.4 | 1.2 | 4 | 4 | 4 |
| Tea extract 2 | p.b.w. | | 1 | | | | | | |
| Tea extract 3 | p.b.w. | | | 0.5 | 1 | 1 | 2.5 | 5 | 10 |
| Antioxidant 1 | p.b.w. | 1 | | | | | | | |
| Antioxidant 2 | p.b.w. | 1 | | | | | | | |
| Zinc white | p.b.w. | 2.5 | 2.5 | 2.5 | 2.5 | 2.5 | 2.5 | 2.5 | 2.5 |
| Stearic acid | p.b.w. | 2 | 2 | 2 | 2 | 2 | 2 | 2 | 2 |
| Wax | p.b.w. | 2 | 2 | 2 | 2 | 2 | 2 | 2 | 2 |
| Aromatic oil 1 | p.b.w. | 5 | 5 | 5 | 5 | 5 | 5 | 5 | 5 |
| Vulcanization accelerator 1 | p.b.w. | 2 | 2 | 2 | 2 | 2 | 2 | 2 | 2 |
| Sulfur 1 | p.b.w. | 1.8 | 1.8 | 1.8 | 1.8 | 1.8 | 1.8 | 1.8 | 1.8 |
| (Catechin content) | p.b.w. | — | 0.65 | 0.035 | 0.07 | 0.07 | 0.175 | 0.35 | 0.70 |
| Mooney viscosity | Index | 100 | 100 | 97 | 98 | 89 | 91 | 86 | 82 |
| Scorch time | Index | 100 | 100 | 105 | 110 | 122 | 105 | 104 | 100 |
| tan δ (60° C.) | Index | 100 | 97 | 98 | 98 | 101 | 96 | 95 | 96 |
| Oxidation resistance of breaking strength | Index | 100 | 99 | 104 | 100 | 102 | 100 | 99 | 99 |
| Oxidation resistance of breaking elongation | Index | 100 | 102 | 108 | 105 | 103 | 101 | 101 | 106 |
| Payne effect | Index | 100 | 92 | 95 | 97 | 97 | 85 | 76 | 75 |

In above Table 2, "p.b.w." means "parts by weight".

TABLE 3

| | | Comparative Example 3 | Example 15 |
|---|---|---|---|
| NR | parts by weight | 50 | 50 |
| BR | parts by weight | 50 | 50 |
| Carbon black 1 | parts by weight | 5 | 5 |
| Silica 1 | parts by weight | 50 | 50 |
| Coupling agent | parts by weight | 4 | 4 |
| Tea extract 3 | parts by weight | | 2 |
| Antioxidant 1 | parts by weight | 1.5 | 0.5 |
| Antioxidant 2 | parts by weight | 1 | |
| Zinc white | parts by weight | 3 | 3 |
| Stearic acid | parts by weight | 2 | 2 |
| Wax | parts by weight | 2 | 2 |
| Aromatic oil 1 | parts by weight | 5 | 5 |
| Vulcanization accelerator 1 | parts by weight | 2 | 2 |
| Sulfur 1 | parts by weight | 1.8 | 1.8 |
| (Catechin content) | parts by weight | — | 0.14 |
| Mooney viscosity | Index | 95 | 91 |
| Scorch time | Index | 121 | 122 |
| tan δ (60° C.) | Index | 94 | 92 |
| Oxidation resistance of breaking strength | Index | 98 | 101 |
| Oxidation resistance of breaking elongation | Index | 94 | 100 |
| Payne effect | Index | 98 | 96 |

Types of raw materials used in Tables 1 to 3 are indicated below.

NR: natural rubber, RSS#3

BR: NIPOL BR1220 manufactured by Zeon Corporation

Carbon black 1: Niteron #200IS (nitrogen adsorption specific surface area: 95 $m^2/g$) manufactured by Nippon Steel Chemical Carbon Co., Ltd.

Silica 1: NIPSIL AQ-N (CTAB adsorption specific surface area: 157 $m^2/g$) manufactured by Tosoh Silica Corporation Coupling agent: Silane coupling agent Si69 manufactured by Degussa AG Tea extract 1: Sunphenon DK (tea extract including 92% by weight of tea polyphenols containing 74% by weight of catechin, 8% by weight of others such as mineral, ash, for example) manufactured by Taiyo Kagaku Co., Ltd.

Tea extract 2: Sunflavon HG (tea extract including 89% by weight of tea polyphenols containing 73% by weight of catechin, 11% by weight of others such as mineral, ash, for example) manufactured by Taiyo Kagaku Co., Ltd.

Tea extract 3: Sunkatol No. 1 (antioxidant including 10% by weight of tea polyphenols containing 70% by weight of catechin, the tea polyphenols being treated with surfactant) manufactured by Taiyo Kagaku Co., Ltd.

Antioxidant 1: NOCRAC 6C manufactured by Ouchi Shinko Chemical Industrial Co., Ltd.

Antioxidant 2: NOCRAC 810NA manufactured by Ouchi Shinko Chemical Industrial Co., Ltd.

Zinc white: Zinc oxide Type 3 manufactured by Seido Chemical Industry Co., Ltd.

Stearic acid: Beads stearic acid manufactured by NOF corporation

Wax: Paraffin wax manufactured by Ouchi Shinko Chemical Industrial Co., Ltd.

Aromatic oil 1: Aromatic oil No. 4 manufactured by Showa Shell Sekiyu K.K.

Vulcanization accelerator 1: NOCCELER NS-P manufactured by Ouchi Shinko Chemical Industrial Co., Ltd.

Sulfur 1: Oil-treated sulfur manufactured by Hosoi Chemical Industry Co., Ltd.

Examples 16 to 18

Eight types of tire rubber compositions having blending proportions as shown in Table 4 (Examples 16 to 18 and Comparative Examples 4 to 8) were prepared. Specifically, the respective blending components except sulfur and vulcanization accelerators were weighted and kneaded for 6 minutes with the Banbury mixer having a capacity of 1.8 L. Then, masterbatches were discharged at 160° C. and were cooled down to a room temperature. These masterbatches were fed to the Banbury mixer having a capacity of 1.8 L and then the sulfur and the vulcanization accelerator were added and mixed together.

The eight types of the tire rubber compositions (Examples 16 to 18 and Comparative Examples 4 to 8) thus obtained were subjected to evaluation of extrudability in accordance with a method shown below. Moreover, each of eight types of the rubber compositions was cured for 30 minutes at 150° C. in a mold having a predetermined shape, so that a test piece was prepared. Thereafter, wear resistance and tan δ values were measured in accordance with methods shown below.

20 Hz. The obtained results were shown in the form of indices relative to a value in Comparative Example 4 defined as 100 in Table 4. A smaller index of tan δ represents a smaller hysteresis loss and lower rolling resistance.

TABLE 4

| | | Example 16 | Example 17 | Example 18 | Comparative Example 4 | Comparative Example 5 | Comparative Example 6 | Comparative Example 7 | Comparative Example 8 |
|---|---|---|---|---|---|---|---|---|---|
| SBR1 | p.b.w. | 97.25 | 97.25 | 97.25 | 97.25 | | 97.25 | 97.25 | 97.25 |
| SBR2 | p.b.w. | | | | | 105 | | | |
| (Oil amount in SBR) | (p.b.w.) | (27.25) | (27.25) | (27.25) | (27.25) | (35) | (27.25) | (27.25) | (27.25) |
| BR | p.b.w. | 30 | 30 | 30 | 30 | 30 | 30 | 30 | 30 |
| Carbon black 2 | p.b.w. | 30 | 30 | 30 | 30 | 30 | | 10 | 10 |
| Carbon black 3 | p.b.w. | | | | | | 30 | | |
| Silica 2 | p.b.w. | 60 | 60 | 60 | 60 | 60 | 60 | 100 | 70 |
| Coupling agent | p.b.w. | 6 | 6 | 6 | 6 | 6 | 6 | 10 | 7 |
| Tea extract 3 | p.b.w. | 1 | 2 | | | 1 | 1 | 1 | |
| Tea extract 1 | p.b.w. | | | 2 | | | | | 7.5 |
| Aromatic oil 2 | p.b.w. | 10 | 10 | 10 | 10 | 10 | 10 | 20 | 10 |
| Antioxidant 3 | p.b.w. | 2 | 2 | 2 | 2 | 2 | 2 | 2 | 2 |
| Antioxidant 4 | p.b.w. | 0.5 | 0.5 | 0.5 | 2 | 0.5 | 0.5 | 0.5 | 0.5 |
| Zinc white | p.b.w. | 3 | 3 | 3 | 3 | 3 | 3 | 3 | 3 |
| Stearic acid | p.b.w. | 2 | 2 | 2 | 2 | 2 | 2 | 2 | 2 |
| Vulcanization accelerator 2 | p.b.w. | 1.5 | 1.5 | 1.5 | 1.5 | 1.5 | 1.5 | 1.5 | 1.5 |
| Vulcanization accelerator 3 | p.b.w. | 2 | 2 | 2 | 2 | 2 | 2 | 2 | 2 |
| Sulfur 2 | p.b.w. | 1.7 | 1.7 | 1.7 | 1.7 | 1.7 | 1.7 | 1.7 | 1.7 |
| Catechin content | p.b.w. | 0.07 | 0.14 | 1.36 | — | 0.07 | 0.07 | 0.07 | 5.11 |
| Total amount of oil | p.b.w. | 37.25 | 37.25 | 37.25 | 37.25 | 45 | 37.25 | 47.25 | 37.25 |
| Extrudability | Index | 110 | 110 | 108 | 100 | 102 | 95 | 94 | 121 |
| Wear resistance | Index | 107 | 110 | 110 | 100 | 102 | 105 | 97 | 85 |
| tan δ (60° C.) | Index | 97 | 95 | 94 | 100 | 114 | 112 | 108 | 94 |

In above Table 4, "p.b.w." means "parts by weight".

Here, Comparative Examples 5 to 8 are comparative examples for facilitating understanding of the second embodiment of the present invention. In other words, Comparative Examples 5 to 8 possess the effect of the first embodiment of the present invention.

Extrudability (Forming Stability)

A Garvey die extrusion test was carried out in accordance with ASTM D2230. Molded bodies having a length of approximately 40 cm in an unvulcanized state were formed by extrusion under conditions of a tuber temperature of 100° C. and screw revolutions of 40 rpm, and the molded bodies were left at rest for 24 hours. Lengths immediately after the extrusion and lengths after 24 hours were measured and then ratios of the lengths (length after 24 hours/length immediately after extrusion) were calculated. The obtained results are shown in the form of indices relative to a value in Comparative Example 4 defined as 100 in Table 4. A larger index represents a smaller dimensional change (shrinkage) of the extruded body and better extrudability.

Wear Resistance

The obtained test pieces were subjected to measurement of wear amounts by using a Lamborn abrasion testing machine (manufactured by Iwamoto Seisakusho Co., Ltd.) under conditions of a load of 49N, a slip ratio of 25%, a time period of 4 minutes, and at a room temperature, in accordance with JIS K6264. The obtained results are shown in the form of indices relative to the reciprocal of a wear amount in Comparative Example 4 defined as 100 in Table 4. A larger index represents better wear resistance.

tan δ

Values tan δ at 60° C. of the obtained test pieces were measured by using the viscoelasticity spectrometer manufactured by Toyo Seiki Seisakusho, Ltd. under conditions of an initial strain of 10%, an amplitude of ±2%, and a frequency of Types of raw materials used in Table 4 are shown below.

SBR 1: Emulsion-polymerized styrene-butadiene rubber having a glass transition temperature of −52° C. (NIPOL 1712 manufactured by Zeon Corporation, an oil-extended product prepared by adding 37.5 parts by weight of an aromatic oil to 100 parts by weight of SBR)

SBR 2: Emulsion-polymerized styrene-butadiene rubber having a glass transition temperature of −20° C. (NIPOL 9529 manufactured by Zeon Corporation, an oil-extended product prepared by adding 50 parts by weight of an aromatic oil to 100 parts by weight of SBR)

BR: Butadiene rubber, NIPOL BR1220 manufactured by Zeon Corporation

Carbon black 2: Nitrogen adsorption specific surface area of 125 $m^2/g$ (N234 manufactured by Showa Cabot K.K.)

Carbon black 3: Nitrogen adsorption specific surface area of 142 $m^2/g$ (Diablack A manufactured by Mitsubishi Chemical Corporation)

Silica 2: CTAB adsorption specific surface area of 160 $m^2/g$ (Zeosil 1165MP manufactured by Rhodia)

Coupling agent: Silane coupling agent Si69 manufactured by Degussa AG

Tea extract 3: Sunkatol No. 1 (antioxidant including 10% by weight of tea polyphenols containing 70% by weight of catechin, the tea polyphenols being treated with surfactant) manufactured by Taiyo Kagaku Co., Ltd.

Tea extract 1: Sunphenon DK (tea extract including 92% by weight of tea polyphenols containing 74% by weight of catechin, 8% by weight of others such as mineral, ash, for example) manufactured by Taiyo Kagaku Co., Ltd.

Aromatic oil 2: Process X-140 manufactured by Japan Energy Corporation

Antioxidant 3: SANTOFLEX 6PPD manufactured by Flexsys

Antioxidant 4: SANTOFLEX 3C manufactured by Flexsys

Zinc white: Zinc oxide Type 3 manufactured by Seido Kagaku Kogyo CO., Ltd.

Stearic acid: Beads stearic acid YR manufactured by NOF corporation

Vulcanization accelerator 2: NOCCELERD-G manufactured by Ouchi Shinko Chemical Industrial Co., Ltd.

Vulcanization accelerator 3: NOCCELER CZ-G manufactured by Ouchi Shinko Chemical Industrial Co., Ltd.

Sulfur 2: "Golden Flower" oil-treated sulfur powder manufactured by Tsurumi Chemical Industry Co., Ltd.

Examples 19 to 26

Fourteen types of tire rubber compositions having blending proportions as shown in Table 5 and 6 (Examples 19 to 26 and Comparative Examples 9 to 14) were prepared. Specifically, the respective blending components except sulfur and vulcanization accelerators were weighted and kneaded for 10 minutes with a Banbury mixer having a capacity of 16 L. Then, masterbatches were discharged at 160° C. and were cooled down to a room temperature. These masterbatches were fed to the Banbury mixer having a capacity of 16 L and then the sulfur and the vulcanization accelerator were added and blended together.

Each of the fourteen types of the tire tread rubber compositions (Examples 19 to 26 and Comparative Examples 9 to 14) was cured for 30 minutes at 150° C. in a mold having a predetermined shape, so that a test piece was prepared. Thereafter, blowout resistance was measured in accordance with a method shown below.

Here, Comparative Examples 10, 12, and 13 are comparative examples for facilitating understanding of the third embodiment of the present invention. In other words, Comparative Examples 10, 12, and 13 possess the effect of the first embodiment of the present invention.

Blowout Resistance

Time required for initiating fatigue breakdown was measured in accordance with JIS K6265 by using a Goodrich flexometer (manufactured by Ueshima Seisakusho Co., Ltd.) under conditions of a load of 20 kg, a stroke of 4.4 mm, revolutions of 1800 rpm, and an ambient temperature of 100° C. The obtained results are shown in the form of indices relative to a value in Comparative Example 9 defined as 100 in Tables 5 and 6. A larger index represents better blowout resistance.

Moreover, racing pneumatic tires with their tire treads formed of fourteen types of the obtained rubber compositions were fabricated. Each of the tires had a tire size of 195/55R15. Each kind of the pneumatic tires thus obtained were mounted on rims having a rim size of 15×6 J at an air pressure of 150 kPa and were put on a testing car. Then a test driver drove on a circuit course (about 2 km around) under a wet condition for 5 rounds and on the circuit course (about 2 km around) under a dry condition for 10 rounds respectively to measure lap time for every round. Wet grip performances, initial dry grip performances (dry grip performances for first halves of driving sessions), and persistence of the dry grip performances (dry grip performances for last halves of driving sessions) were evaluated in accordance with judgment method described below. The obtained results are shown in Tables 5 and 6.

Initial Dry Grip Performances (Dry Grip Performances in First Halves of Driving Sessions)

Average time of first to third laps out of continuous driving of ten rounds on the circuit course under the dry condition was evaluated based on the following judgment criteria with average time achieved by use of the pneumatic tires of Comparative Example 9 defined as reference time. A higher score represents a better aspect in quickly establishing the dry grip performance at an initial stage of driving.

5: The average lap time is faster than the reference time by 0.5 seconds or more 4: The average lap time is faster than the reference time by 0.2 seconds or more but less than 0.5 seconds 3: A difference between the average lap time and the reference time falls in a range from ±0.2 seconds (exclusive)

2: The average lap time is slower than the reference time by 0.2 seconds or more but less than 0.5 seconds 1: The average lap time is slower than the reference time by 0.5 seconds or more Persistence of Dry Grip Performance (Dry Grip Performances in Last Halves of Driving sessions)

Average time of eighth to tenth laps out of continuous driving of ten rounds on the circuit course under the dry condition was evaluated based on the following judgment criteria with the average time achieved by use of the pneumatic tires of Comparative Example 9 defined as the reference time. A higher score represents a better aspect in persistence of the grip performance.

5: The average lap time is faster than the reference time by 0.5 seconds or more 4: The average lap time is faster than the reference time by 0.2 seconds or more but less than 0.5 seconds 3: A difference between the average lap time and the reference time falls in the range from ±0.2 seconds (exclusive)

2: The average lap time is slower than the reference time by 0.2 seconds or more but less than 0.5 seconds 1: The average lap time is slower than the reference time by 0.5 seconds or more Wet Grip Performances Average time of five laps of continuous driving of five rounds on the circuit course under the wet condition was evaluated based on the following judgment criteria with average time achieved by use of the pneumatic tires of Comparative Example 9 defined as reference time. A higher score represents a better aspect of the wet grip performance.

5: The average lap time is faster than the reference time by 0.5 seconds or more 4: The average lap time is faster than the reference time by 0.2 seconds or more but less than 0.5 seconds 3: A difference between the average lap time and the reference time falls in the range from ±0.2 seconds (exclusive)

2: The average lap time is slower than the reference time by 0.2 seconds or more but less than 0.5 seconds 1: The average lap time is slower than the reference time by 0.5 seconds or more

TABLE 5

| | | Example 19 | Example 20 | Example 21 | Comparative Example 9 | Comparative Example 10 | Comparative Example 11 | Comparative Example 12 | Comparative Example 13 |
|---|---|---|---|---|---|---|---|---|---|
| SBR 2 | p.b.w. | 15 | 30 | 30 | 15 | | 30 | 30 | 30 |
| SBR 3 | p.b.w. | 135 | 120 | 120 | 135 | 150 | 120 | 120 | 120 |
| (Oil amount in | (p.b.w.) | (50) | (50) | (50) | (50) | (50) | (50) | (50) | (50) |

TABLE 5-continued

| | | Example 19 | Example 20 | Example 21 | Comparative Example 9 | Comparative Example 10 | Comparative Example 11 | Comparative Example 12 | Comparative Example 13 |
|---|---|---|---|---|---|---|---|---|---|
| SBR) | | | | | | | | | |
| Carbon black 2 | p.b.w. | | | | | | | 120 | |
| Carbon black 3 | p.b.w. | | | 120 | | | | | |
| Carbon black 4 | p.b.w. | 120 | 120 | | 120 | 120 | 180 | | |
| Carbon black 5 | p.b.w. | | | | | | | | 120 |
| Tea extract 3 | p.b.w. | 2 | 2 | 2 | | 2 | 2 | 2 | 2 |
| Aromatic terpene resin | p.b.w. | | 25 | 25 | | | | 25 | 25 |
| Aromatic oil 2 | p.b.w. | 100 | 100 | 100 | 100 | 100 | 100 | 100 | 100 |
| Antioxidant 3 | p.b.w. | 2 | 2 | 2 | 2 | 2 | 2 | 2 | 2 |
| Antioxidant 4 | p.b.w. | 2 | 0.5 | 0.5 | 2 | 2 | 2 | 0.5 | 0.5 |
| Zinc white | p.b.w. | 3 | 3 | 3 | 3 | 3 | 3 | 3 | 3 |
| Stearic acid | p.b.w. | 2 | 2 | 2 | 2 | 2 | 2 | 2 | 2 |
| Vulcanization accelerator 4 | p.b.w. | 2 | 2 | 2 | 2 | 2 | 2 | 2 | 2 |
| Vulcanization accelerator 3 | p.b.w. | 2 | 2 | 2 | 2 | 2 | 2 | 2 | 2 |
| Sulfur 2 | p.b.w. | 1.7 | 1.7 | 1.7 | 1.7 | 1.7 | 1.7 | 1.7 | 1.7 |
| Catechin content | p.b.w. | 0.14 | 0.14 | 0.14 | — | 0.14 | 0.14 | 0.14 | 0.14 |
| Total amount of oil | p.b.w. | 150 | 150 | 150 | 150 | 150 | 150 | 150 | 150 |
| Blowout resistance | Index | 109 | 118 | 140 | 100 | 115 | 64 | 168 | 40 |
| Initial dry grip performance | Score | 3 | 5 | 3 | 3 | 2 | 5 | 1 | 5 |
| Persistence of dry grip performance | Score | 4 | 4 | 5 | 3 | 3 | 1 | 4 | 1 |
| Wet grip performance | Score | 3 | 3 | 4 | 3 | 3 | 2 | 4 | 1 |

In above Table 5, "p.b.w." means "parts by weight".

TABLE 6

| | | Example 22 | Example 23 | Example 24 | Example 25 | Example 26 | Comparative Example 14 |
|---|---|---|---|---|---|---|---|
| SBR 2 | p.b.w. | 30 | 30 | 30 | 30 | 30 | 15 |
| SBR 3 | p.b.w. | 120 | 120 | 120 | 120 | 120 | 135 |
| (Oil amount in SBR) | (p.b.w.) | (50) | (50) | (50) | (50) | (50) | (50) |
| Carbon black 3 | p.b.w. | 70 | | | | | 70 |
| Carbon black 4 | p.b.w. | | 70 | 70 | 70 | 70 | |
| Silica 3 | p.b.w. | 50 | 50 | 50 | 50 | 50 | 50 |
| Coupling agent | p.b.w. | 5 | 5 | 5 | 5 | 5 | 5 |
| Tea extract 3 | p.b.w. | 1 | 1 | 4 | 1 | 2 | |
| Aromatic terpene resin | p.b.w. | | 25 | 25 | | 45 | |
| Terpene phenol resin | p.b.w. | | | | 25 | | |
| Aromatic oil 2 | p.b.w. | 75 | 75 | 75 | 75 | 55 | 75 |
| Antioxidant 3 | p.b.w. | 2 | 2 | 2 | 2 | 2 | 2 |
| Antioxidant 4 | p.b.w. | 0.5 | 0.5 | 0.5 | 0.5 | 0.5 | 2 |
| Zinc white | p.b.w. | 3 | 3 | 3 | 3 | 3 | 3 |
| Stearic acid | p.b.w. | 2 | 2 | 2 | 2 | 2 | 2 |
| Vulcanization accelerator 4 | p.b.w. | 2 | 2 | 2 | 2 | 2 | 2 |
| Vulcanization accelerator 3 | p.b.w. | 2 | 2 | 2 | 2 | 2 | 2 |
| Sulfur 2 | p.b.w. | 2 | 2 | 2 | 2 | 2 | 2 |
| Catechin content | p.b.w. | 0.07 | 0.07 | 0.28 | 0.07 | 0.14 | — |
| Total amount of oil | p.b.w. | 125 | 125 | 125 | 125 | 105 | 125 |
| Blowout resistance | Index | 158 | 132 | 130 | 125 | 120 | 143 |
| Initial dry grip performance | Score | 3 | 4 | 4 | 5 | 5 | 2 |
| Persistence of dry grip performance | Score | 4 | 4 | 4 | 4 | 5 | 3 |
| Wet grip performance | Score | 4 | 4 | 5 | 4 | 5 | 4 |

In above Table 6, "p.b.w." means "parts by weight".

Types of raw materials used in Tables 5 and 6 are shown below.

SBR 2: Emulsion-polymerized styrene-butadiene rubber having a glass transition temperature of −20° C. (NIPOL 9529 manufactured by Zeon Corporation, an oil-extended product prepared by adding 50 parts by weight of an aromatic oil to 100 parts by weight of SBR)

SBR 3: Emulsion-polymerized styrene-butadiene rubber having a glass transition temperature of −35° C. (NIPOL 9526 manufactured by Zeon Corporation, an oil-extended product prepared by adding 50 parts by weight of an aromatic oil to 100 parts by weight of SBR)

Carbon black 2: Nitrogen adsorption specific surface area of 125 $m^2/g$ (N234 manufactured by Showa Cabot K.K.)

Carbon black 3: Nitrogen adsorption specific surface area of 142 $m^2/g$ (Diablack A manufactured by Mitsubishi Chemical Corporation)

Carbon black 4: Nitrogen adsorption specific surface area of 250 $M^2/g$ (Raven 2500 ULTRA manufactured by Columbian Chemicals Company)

Carbon black 5: Nitrogen adsorption specific surface area 390 $m^2/g$ (CD2019 manufactured by Columbian Chemicals Company)

Silica 3: 7000GR manufactured by Degussa AG (CTAB adsorption specific surface area: 155 $m^2/g$)

Coupling agent: Silane coupling agent Si69 manufactured by Degussa AG

Tea extract 3: Sunkatol No. 1 (antioxidant including 10% by weight of tea polyphenols containing 70% by weight of catechin, the tea polyphenols being treated with surfactant) manufactured by Taiyo Kagaku Co., Ltd.

Aromatic terpene resin: Aromatic modified terpene resin having a softening point 85° C. (YS Resin TO85 manufactured by Yasuhara Chemical Co., Ltd.)

Terpene phenol resin: Softening point of 125° C. (YS Resin TO125 manufactured by Yasuhara Chemical Co., Ltd.)

Aromatic oil 2: Process X-140 manufactured by Japan Energy Corporation

Antioxidant 3: SANTOFLEX 6PPD manufactured by Flexsys

Antioxidant 4: SANTOFLEX 3C manufactured by Flexsys

Zinc white: Zinc oxide Type 3 manufactured by Seido Kagaku Kogyo CO., Ltd.

Stearic acid: Beads stearic acid YR manufactured by NOF corporation

Vulcanization accelerator 4: NOCCELER TOT-N manufactured by Ouchi Shinko Chemical Industrial Co., Ltd.

Vulcanization accelerator 3: NOCCELER CZ-G manufactured by Ouchi Shinko Chemical Industrial Co., Ltd.

Sulfur 2: "Golden Flower" oil-treated sulfur powder manufactured by Tsurumi Chemical Industry Co., Ltd.

What is claimed is:

1. A tire rubber composition comprising a blend of:

100 parts by weight of a diene rubber;

5 to 130 parts by weight of an inorganic filler; and 0.01 to 10 parts by weight of a tea extract containing a catechin and non-catechin tea polyphenols.

2. The tire rubber composition according to claim 1, wherein the tea extract contains 5% by weight or more of the catechin.

3. The tire rubber composition according to claim 1, wherein the inorganic filler is at least one selected from a carbon black and a silica.

4. The tire rubber composition according to claim 3, wherein 20 parts by weight or more of the silica is blended with 100 parts by weight of the diene rubber.

5. A tire tread rubber composition comprising the tire rubber composition according to claim 1, wherein the diene rubber contains 10% by weight or more of an aromatic vinyl-conjugated diene copolymer having a glass transition temperature of −25° C. or below, the inorganic filler includes a carbon black having a nitrogen adsorption specific surface area of 100 to 140 $m^2/g$ and a silica having a CTAB adsorption specific surface area of 80 to 250 $m^2/g$, the tire tread rubber composition includes a blend of:

100 parts by weight of the diene rubber:

5 to 50 parts by weight of the carbon black and 30 to 90 parts by weight of the silica, a total amount of the carbon black and the silica being 40 to 100 parts by weight;

0.01 to 5 parts by weight of the tea extract;

3 to 40 parts by weight of a softener; and a sulfur-containing silane coupling agent which is 2 to 15% by weight relative to a blending amount of the silica.

6. A tire tread rubber composition comprising the tire rubber composition according to claim 1, wherein the diene rubber contains 10% by weight or more of a styrene-butadiene rubber having a glass transition temperature of −25° C. or above, and the tire tread rubber composition includes a blend of:

100 parts by weight of the diene rubber;

80 to 150 parts by weight of the inorganic filler which contains 10 to 150 parts by weight of a carbon black having a nitrogen adsorption specific surface area of 140 to 350 $m^2/g$;

0.01 to 5 parts by weight of the tea extract; and 60 to 200 parts by weight of a softener.

7. The tire tread rubber composition according to claim 6, wherein the glass transition temperature of the styrene-butadiene rubber is −20° C. or above, and 20% by weight or more of the styrene-butadiene rubber is blended in the diene rubber.

8. The tire tread rubber composition according to claim 6, wherein at least one selected from a terpene phenol resin and an aromatic modified terpene resin having a softening point of 80° C. to 130° C. is blended with 100 parts by weight of the diene rubber, in an amount of 7 to 70 parts by weight.

9. The tire tread rubber composition according to claim 7, wherein at least one selected from a terpene phenol resin and an aromatic modified terpene resin having a softening point of 80° C. to 130° C. is blended with 100 parts by weight of the diene rubber, in an amount of 7 to 70 parts by weight.

10. The tire tread rubber composition according to claim 5, wherein the tea extract includes at least one selected from the group consisting of (+)-catechin, (−)-epicatechin, (+)-gallocatechin, (−)-epigallocatechin, (−)-epicatechin gallate, and (−)-epigallocatechin gallate.

11. The tire tread rubber composition according to claim 6, wherein the tea extract includes at least one selected from the group consisting of (+)-catechin, (−)-epicatechin, (+)-gallocatechin, (−)-epigallocatechin, (−)-epicatechin gallate, and (−)-epigallocatechin gallate.

12. A pneumatic tire comprising:

the tire rubber composition according to claim 1.

13. A pneumatic tire comprising:

the tire tread rubber composition according to claim 5.

14. A pneumatic tire comprising:

the tire tread rubber composition according to claim 6.

* * * * *